(12) United States Patent
Zinn

(10) Patent No.: US 7,064,531 B1
(45) Date of Patent: Jun. 20, 2006

(54) PWM BUCK REGULATOR WITH LDO STANDBY MODE

(75) Inventor: Raymond Zinn, Atherton, CA (US)

(73) Assignee: Micrel, Inc., San Jose, CA (US)

( * ) Notice: Subject to any disclaimer, the term of this patent is extended or adjusted under 35 U.S.C. 154(b) by 0 days.

(21) Appl. No.: 11/096,680

(22) Filed: Mar. 31, 2005

(51) Int. Cl.
*G05F 1/40* (2006.01)

(52) U.S. Cl. ............... 323/268; 323/283; 323/282

(58) Field of Classification Search ............ 323/268, 323/271, 273, 274, 282, 283, 284, 351; 327/403, 327/404, 541, 543
See application file for complete search history.

(56) References Cited

U.S. PATENT DOCUMENTS

| 5,773,966 | A | 6/1998 | Steigerwald |
| 6,150,798 | A | 11/2000 | Ferry et al. |
| 6,229,289 | B1 | 5/2001 | Piovaccari et al. |
| 6,611,132 | B1 | 8/2003 | Nakagawa et al. |
| 6,621,256 | B1 * | 9/2003 | Muratov et al. ............. 323/282 |
| 6,661,211 | B1 * | 12/2003 | Currelly et al. ............. 323/268 |

* cited by examiner

*Primary Examiner*—Adolf Berhane
(74) *Attorney, Agent, or Firm*—Patent Law Group LLP; Brian D. Ogonowsky

(57) ABSTRACT

A voltage regulator is disclosed having a PWM portion and an LDO portion on a single chip. The PWM portion switches a large MOS transistor (or synchronous MOS transistors) at a high frequency to supply medium and high currents (e.g., 600 mA) to a load. During a standby mode, the regulator switches to an LDO mode and disables the PWM portion. The LDO mode controls a very small MOS series transistor to supply the standby mode current. Since the gate of the series MOS transistor is small, only a small variation in gate charge is needed to adequately control the conductance of the series transistor during the standby mode. Therefore, much less control current is used by the LDO than if the LDO used a series transistor of the same size as the switching transistor.

17 Claims, 3 Drawing Sheets

PWM BUCK REGULATOR WITH LDO STANDBY MODE

FIELD OF THE INVENTION

This invention relates to voltage regulators and, in particular, to voltage regulators having a pulse width modulation (PWM) mode and a low drop out (LDO) mode.

BACKGROUND

The invention relates to voltage regulators using MOS transistors.

Switching regulators and linear regulators are well known types of voltage regulators for converting an unregulated voltage, such as a battery voltage, to a regulated DC voltage of a desired value. One type of switching regulator is a PWM regulator that turns an MOS switching transistor on and off at a certain frequency. Synchronous switching transistors may also be used. In a conventional buck regulator topology, the power supply voltage is intermittently coupled to an inductor, and the inductor conducts a triangular current waveform to recharge an output filter capacitor. The charged filter capacitor provides a relatively constant voltage to the load. A feedback signal, which is typically a divided output voltage, determines when to shut off the switching transistor during each switching cycle. The switch on-time percentage is called the duty cycle, and this duty cycle is regulated so as to provide a substantially constant voltage at the output despite load current changes. There are many types of switching regulators.

A linear regulator, also referred to as a low dropout (LDO) regulator, controls the conductance of an MOS transistor in series between the unregulated power supply and the output terminal of the regulator. The conductance of the transistor is controlled based upon the feedback voltage to keep the output voltage at the desired level.

Switching regulators are generally considered to be more efficient than linear regulators since the MOS switching transistor is either on or off. When a transistor is fully on, such as in saturation or near the edge of saturation, the transistor is a highly efficient switch, and there is a minimum of wasted power through the switch. However, due to the high frequency (e.g., 2 MHz) turning on and off of the MOS switch, substantial current is used by the control circuit when repeatedly charging and discharging the gate. Accordingly, a PWM regulator is not an efficient choice for very low load currents.

A linear regulator, on the other hand, provides a very smooth output by constantly adjusting a control voltage of an MOS series transistor, which is always conducting. Since the series transistor is not being turned on and off at a high frequency, the control current used to vary the charge on the gate of the MOS series transistor is much less than the control current that would be used by a PWM regulator to repeatedly charge the switching transistor's gate for the same load current.

Voltage converters are known that switch between a PWM regulator and an LDO regulator to obtain the highest efficiency under various circumstances. Such converters are found in U.S. Pat. Nos. 6,229,289 and 6,150,798. However, the LDO series transistors in those prior art circuits are large enough to support the maximum rated load current for the converters. So the LDO control circuit must source and sink a significant amount of charge to and from the gate of the large MOS transistor to rapidly control the conductance (related to $V_{gs}$) of the transistor.

SUMMARY

An extremely efficient regulator is disclosed having a PWM portion and an LDO portion on a single chip. The PWM portion switches a large MOS transistor (or synchronous MOS transistors) at a high frequency to supply medium and high currents (e.g., 600 mA) to a load (the application employing the regulator). When the application is in a standby mode, the load current drops to a very small amount (e.g., <60 mA). During the standby mode, the regulator switches to an LDO mode and disables the PWM portion. The LDO mode controls a very small MOS series transistor to supply the standby mode current. Since the gate of the series MOS transistor is small, only a small variation in gate charge is needed to adequately control the conductance of the series transistor during the standby mode. Therefore, much less control current is used by the LDO than in the prior art circuits described above, greatly prolonging battery life.

DETAILED DESCRIPTION

Figure 1:
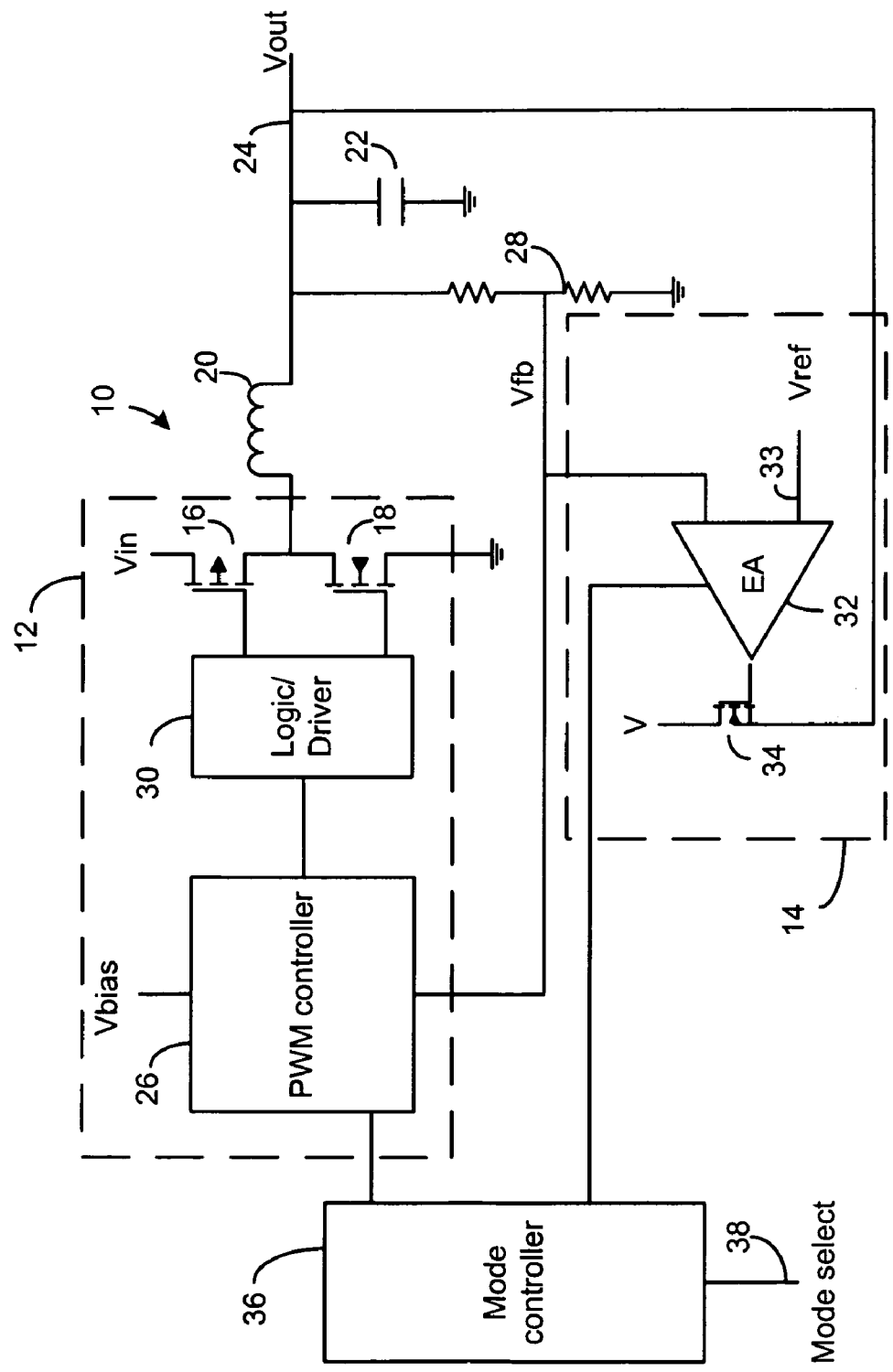
FIG. 1 is a block diagram illustrating one embodiment of the invention.

FIG. 1 illustrates a voltage converter 10 including a PWM regulator 12 and a linear regulator 14, also referred to as a low dropout (LDO) regulator.

The PWM regulator 12 synchronously controls large MOS transistors 16 and 18 to be on and off to intermittently couple the power supply voltage Vin to the input of an inductor 20. The power supply may be a battery. A capacitor 22 smoothes the triangular inductor current to provide a DC voltage ($V_{out}$) at the output node 24. The amount of time that the transistor 16 is on versus the total time is called the duty cycle and determines the voltage at node 24.

A PWM controller 26 receives a feedback signal from a resistor divider 28, and the controller 26 adjusts the duty cycle of the transistors 16, 18 to keep the feedback voltage at a predetermined level. Logic/driver 30 supplies the control signals to the PMOS transistor 16 and NMOS transistor 18 to cause them to alternately conduct.

MOS transistors 16, 18 are relatively large to handle the maximum rated current (e.g, 0.5 A–5 A). The size is measured by the gate width. The length of the gate is determined by the required breakdown voltage.

The LDO regulator 14 has an error amplifier 32 that receives the feedback voltage and a reference voltage 33 and outputs an error voltage for controlling the conductance of MOS transistor 34. The error amplifier 32 may contain a capacitor coupled to ground, and a differential amplifier either supplies current to the capacitor to increase the error voltage or sinks current from the capacitor to decrease the error voltage. If the feedback voltage matches the reference voltage, the error voltage remains constant.

An MOS series transistor 34 has its gate coupled to the error voltage for creating a variable resistance between the input voltage V and output node 24. Increasing the error voltage increases the charge on the gate to increase the transistor's conductance to raise $V_{out}$. Decreasing the error voltage decreases the charge on the gate to decrease the transistor's conductance to lower $V_{out}$.

Since, in the present invention, the LDO regulator 14 is only enabled for a low current standby mode, the size of the MOS series transistor 34 is less than one-fifth the size of the switching transistor 16 or 18. In one embodiment, the ratio is less than 1/10. The smaller the series transistor is, the more efficient the LDO regulator 14 is, as long as the series transistor can adequately supply the load current in the standby mode. In one embodiment, the maximum load current in the LDO mode is 60 mA.

Accordingly, either the PWM regulator 12 or the LDO regulator 14 regulates the output voltage when enabled.

The selection of the PWM or LDO mode is controlled by a mode controller 36, which removes power from components either in the PWM regulator or LDO regulator. In one embodiment, the mode controller 36 disables the LDO regulator by terminating power to the LDO error amplifier 32 to cause the series transistor to be an open circuit. The mode controller 36 disables the PWM regulator by removing power from all or some of its components, causing the MOS transistors 16 and 18 to be open circuits.

Figure 2A:
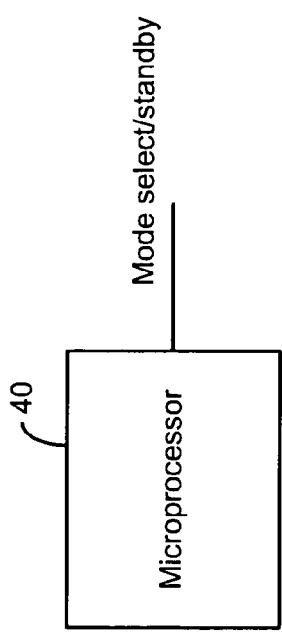
FIG. 2A illustrates the mode select controlled by a microprocessor in the application system.

The mode controller 36 changes state in response to a mode select signal 38. In one embodiment, shown in FIG. 2A, a microprocessor 40 in the application (e.g., a cell phone) issues a standby signal after a period of non-use, which shuts down various components (e.g., the display screen) in the application, creating a low load situation. The standby signal is coupled to the mode controller 36 to cause the PWM regulator to be disabled and the LDO regulator to be enabled (apply power to the error amplifier 32).

Figure 2B:
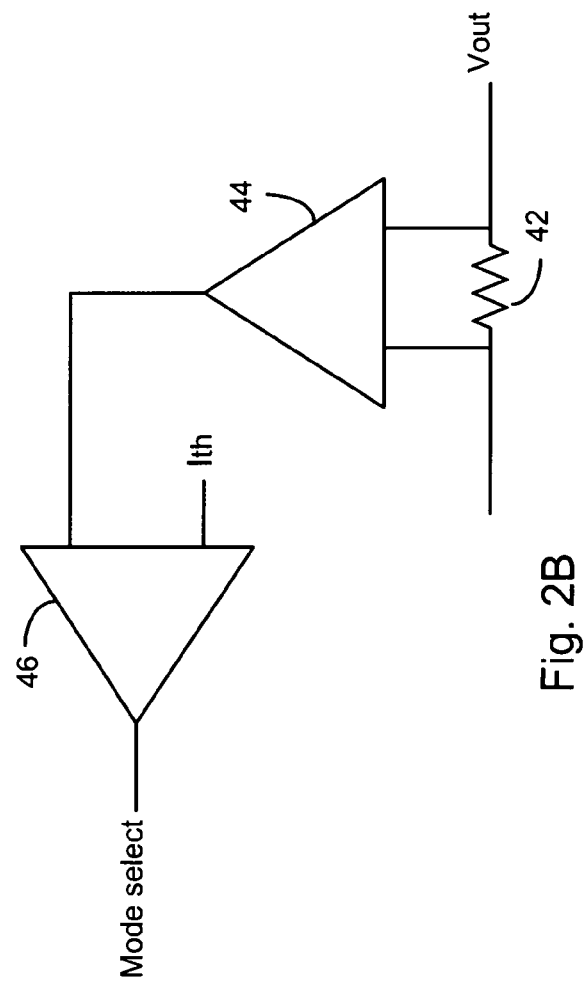
FIG. 2B illustrates the mode select controlled by a load current sensor.

In another embodiment, the low load condition may be sensed by sensing the actual load current, as shown in FIG. 2B. In FIG. 2B, a low value series resistor 42 is placed in series with the output node 24 (FIG. 1) of the regulator, where the voltage across the resistor is proportional to the load current. A differential amplifier 44 senses the voltage difference and applies this amplified difference to a hysteresis comparator 46, which compares the difference to a reference voltage that sets a current threshold for transitioning between the regulator modes. The output of the comparator 46 is the mode select signal.

Figure 3:
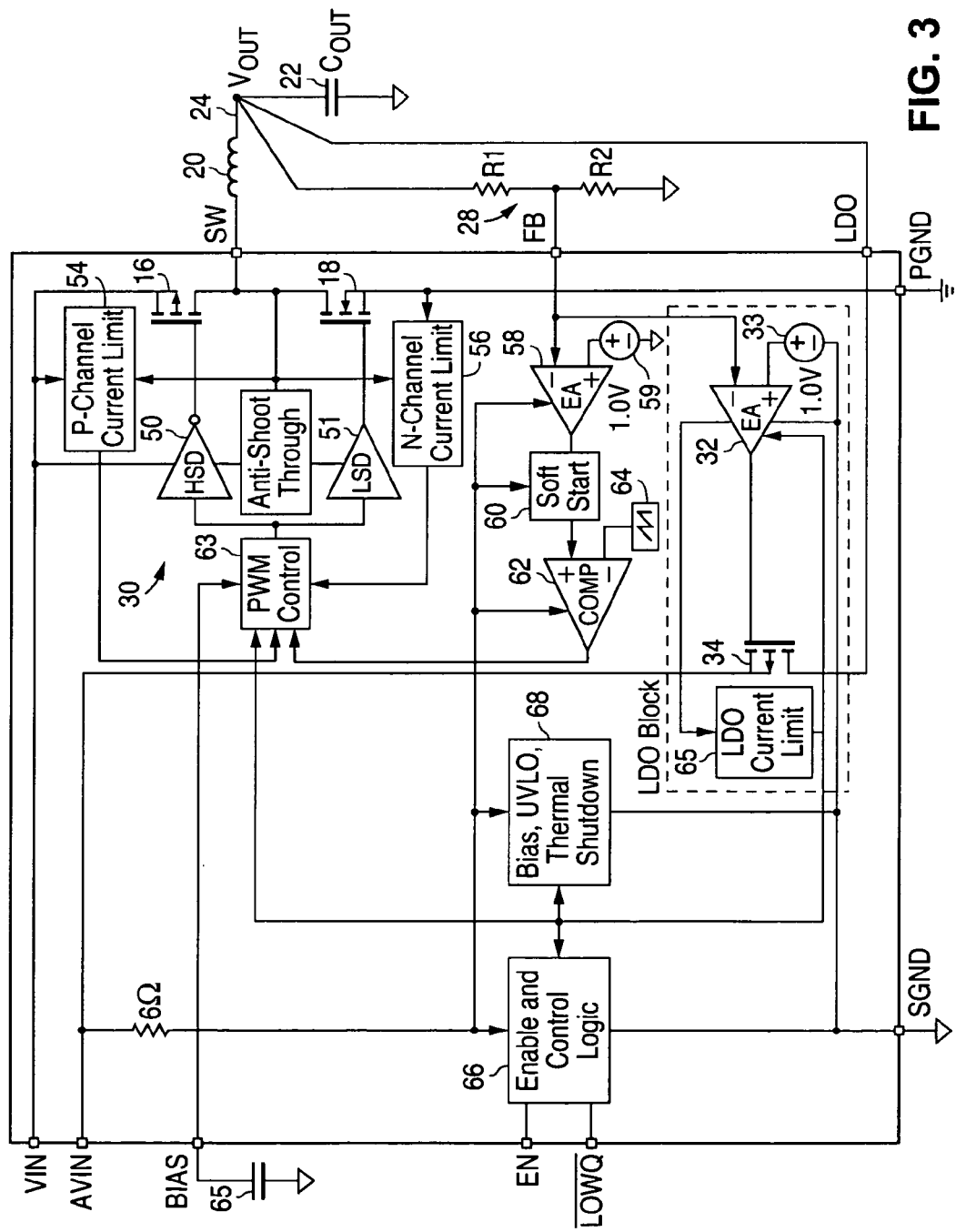
FIG. 3 is a more detailed block diagram of one embodiment of the invention.

FIG. 3 is a more detailed block diagram of a single chip, dual mode converter in accordance with one embodiment of the invention. All elements within the large rectangle are on-chip, and pins are identified. Circuitry in common with FIG. 1 will not be discussed in detail.

The logic/driver 30 is shown as high side driver 50 and low side driver 51 connected to an anti-shoot-through circuit 53 for preventing simultaneous conduction. A p-channel current limit circuit 54 and an N-channel current limit circuit 56 sense a voltage at a node of the associated transistor to determine the current and shut off the transistor if the current exceeds a threshold.

A PWM error amplifier 58 receives the feedback voltage and a reference voltage 59 and outputs an error signal. A soft start circuit 60 limits the error signal at start up to temporarily limit the duty cycle.

A comparator 62 compares a sawtooth waveform (generated by an oscillator 64) to the error signal. The PWM control 63 turns on the PMOS transistor 16 at the beginning of a cycle and turns off the PMOS transistor 16 when the sawtooth waveform level exceeds the error signal. The NMOS transistor 18 has an opposite conduction state.

An LDO current limit circuit 65 senses the current through the series transistor 34 and turns off the LDO error amplifier 32 if the current exceeds a threshold (likely indicating that there is a fault in the application). The LDO series transistor 34 receives an input voltage AVIN that is the VIN voltage (i.e., power supply voltage) but filtered by an external capacitor 65 to filter out any high frequency noise created by the PWM portion. The LDO series transistor 34 may be coupled directly to the DC output node 24 of the converter or connected to the DC output node through the inductor 20 (acting as a low value resistor with a DC current).

An enable and control logic circuit 66 receives a mode select signal $\overline{LOWQ}$ and, based on the $\overline{LOWQ}$ state, enables either the PWM regulator or the LDO regulator. Circuit 66 also receives an enable signal EN that shuts down both regulators.

A bias, UVLO, thermal shutdown circuit 68 provides power to certain components unless certain conditions are met, such as a battery undervoltage, over-temperature detection, EN signal low.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

What is claimed is:

1. A voltage converter comprising:

a pulse width modulation (PWM) regulator portion having a PWM control and at least one MOS switching transistor of a first size having a first terminal connected to an input voltage and a second terminal providing an output current to a load, the PWM control receiving a feedback voltage corresponding to an output voltage of the converter and switching the at least one MOS switching transistor at a duty cycle to maintain a regulated output voltage of the converter, the at least one MOS switching transistor of a first size providing up to a first maximum current to the load;

a low dropout (LDO) regulator portion having an error amplifier and an MOS series transistor whose conductance is controlled by an output of the error amplifier, the error amplifier receiving a feedback voltage corresponding to an output voltage of the converter and generating an error signal based on a difference between the feedback voltage and a reference voltage, the MOS series transistor having a first terminal connected to an input voltage and a second terminal providing a regulated voltage to the load, the MOS series transistor being of a second size less than one-fifth the first size, the MOS series transistor providing up to a second maximum current to the load, the second maximum current being less than one-fifth the first maximum current; and a mode select circuit that receives a mode select signal in a first state indicating the onset of a low current mode and, in response, disables the PWM regulator portion and enables the LDO regulator portion, wherein the mode select circuit also receives a mode select signal in a second state indicating a non-low current mode and, in response, enables the PWM regulator portion and disables the LDO regulator portion, the PWM regulator portion, the LDO regulator portion, and the mode select circuit being formed on a single chip.

2. The converter of claim 1 wherein the first maximum current is greater than 0.5 A and the second maximum current is less than 0.1 A.

3. The converter of claim 1 wherein the at least one MOS switching transistor comprises a PMOS transistor and a synchronously switched NMOS transistor.

4. The converter of claim 1 further comprising a first circuit that generates the mode select signal to designate a low current standby mode.

5. The converter of claim 4 wherein the first circuit is a microprocessor.

6. The converter of claim 4 wherein the first circuit is a current sense circuit that senses a load and generates the mode select signal when the load current goes below a threshold current.

7. The converter of claim 1 wherein the MOS series transistor is of a second size less than one-tenth the first size.

8. The converter of claim 1 wherein the first terminal of the at least one MOS switching transistor is connected to a power supply voltage, and the first terminal of the MOS series transistor is connected to a filtered power supply voltage to filter out high frequency noise in the power supply voltage caused by operation of the PWM regulator portion.

9. The converter of claim 1 further comprising a filter circuit having an output terminal connected to a DC output terminal of the converter, wherein the second terminal of the at least one MOS switching transistor is connected to an input of the filter circuit, and wherein the second terminal of the MOS series transistor is connected to the DC output terminal of the converter.

10. The converter of claim 1 further comprising a filter circuit having an output terminal connected to a DC output terminal of the converter, wherein the second terminal of the at least one MOS switching transistor and the second terminal of the MOS series transistor are connected to an input of the filter circuit.

11. The converter of claim 1 wherein the feedback voltage to the PWM control is the same feedback voltage to the error amplifier in the LDO regulator portion.

12. A method for voltage conversion comprising comprising:
switching at least one MOS switching transistor of a first size at a duty cycle to maintain a regulated output voltage of a converter, the at least one MOS switching transistor providing up to a first maximum current to the load, the switching being controlled by a pulse width modulation (PWM) regulator portion having a PWM control, the at least one MOS switching transistor having a first terminal connected to an input voltage and a second terminal providing an output current to a load;

receiving a feedback voltage by the PWM control corresponding to an output voltage of the converter to control the duty cycle of the at least one MOS switching transistor;

controlling a conductance of an MOS series transistor by an output of an error amplifier in a low dropout (LDO) regulator portion of the converter, the MOS series transistor having a first terminal connected to an input voltage and a second terminal providing a regulated voltage to the load, the MOS series transistor being of a second size less than one-fifth the first size, the MOS series transistor providing up to a second maximum current to the load, the second maximum current being less than one-fifth the first maximum current;

receiving a feedback voltage by the error amplifier corresponding to an output voltage of the converter and generating an error signal based on a difference between the feedback voltage and a reference voltage;

receiving by a mode select circuit a mode select signal in a first state indicating the onset of a low current mode and, in response, disabling the PWM regulator portion and enabling the LDO regulator portion; and receiving by the mode select circuit a mode select signal in a second state indicating a non-low current mode and, in response, enabling the PWM regulator portion and disabling the LDO regulator portion, the PWM regulator portion, the LDO regulator portion, and the mode select circuit being formed on a single chip.

13. The method of claim 12 wherein the first maximum current is greater than 0.5 A and the second maximum current is less than 0.1 A.

14. The method of claim 12 wherein the at least one MOS switching transistor comprises a PMOS transistor and a synchronously switched NMOS transistor.

15. The method of claim 12 wherein the MOS series transistor is of a second size less than one-tenth the first size.

16. The method of claim 12 wherein the first terminal of the at least one MOS switching transistor is connected to a power supply voltage, the method further comprising filtering out high frequency noise in the power supply voltage caused by operation of the PWM regulator portion to create a filtered power supply signal, wherein the first terminal of the MOS series transistor is connected to the filtered power supply voltage.

17. The method of claim 12 further comprising filtering a current output by the at least one MOS switching transistor to create a DC output voltage of the converter.

* * * * *